(12) United States Patent
Li et al.

(10) Patent No.: US 10,756,659 B1
(45) Date of Patent: Aug. 25, 2020

(54) COUNTER ELECTROMOTIVE FORCE ESTIMATION

(71) Applicant: Rockwell Automation Technologies, Inc., Mayfield Heights, OH (US)

(72) Inventors: Bing Li, Mequon, WI (US); Timothy M. Rowan, Wauwatosa, WI (US); Zhenyu Ye, Mequon, WI (US); Zhendong Zhang, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/398,961

(22) Filed: Apr. 30, 2019

(51) Int. Cl.
  *H02P 21/13* (2006.01)
  *H02P 21/22* (2016.01)
  *H02P 21/00* (2016.01)

(52) U.S. Cl.
  CPC .......... *H02P 21/13* (2013.01); *H02P 21/0003* (2013.01); *H02P 21/22* (2016.02)

(58) Field of Classification Search
  CPC .................................. H02P 21/13; H02P 21/22
  USPC .............................. 318/400.02, 400.01, 700
  See application file for complete search history.

(56) References Cited

U.S. PATENT DOCUMENTS 5,187,419 A * 2/1993 DeLange ................ H02P 27/02
    318/805

* cited by examiner

*Primary Examiner* — David Luo
(74) *Attorney, Agent, or Firm* — Kunzler Bean & Adamson

(57) ABSTRACT

For counter electromotive force estimation, a disturbance estimator calculates an estimated disturbance as a control function of a quadrature axis current regulator output signal and a quadrature axis current feedback signal of a running permanent magnet motor. A calculator calculates an estimated counter electromotive force of the running permanent magnet motor as a function of the estimated disturbance, a control flux, and an angular velocity.

20 Claims, 17 Drawing Sheets

US 10,756,659 B1

COUNTER ELECTROMOTIVE FORCE ESTIMATION

BACKGROUND INFORMATION

The subject matter disclosed herein relates to counter electromotive force estimation.

BRIEF DESCRIPTION

An apparatus for counter electromotive force estimation is disclosed. A disturbance estimator calculates an estimated disturbance as a control function of a quadrature axis current regulator output signal and a quadrature axis current feedback signal of a running permanent magnet motor. A calculator calculates an estimated counter electromotive force of the running permanent magnet motor as a function of the estimated disturbance, a control flux, and an angular velocity.

A method for counter electromotive force estimation is also disclosed. The method includes calculating an estimated disturbance as a control function of a quadrature axis current regulator output signal and a quadrature axis current feedback signal of a running permanent magnet motor. The method further includes calculating an estimated counter electromotive force of the running permanent magnet motor as a function of the estimated disturbance, a control flux, and an angular velocity.

A computer program product for counter electromotive force estimation is further disclosed. The computer program product includes a computer readable storage medium having program code embodied therein. The program code is readable/executable by the processor to calculate an estimated disturbance as a control function of a quadrature axis current regulator output signal and a quadrature axis current feedback signal of a running permanent magnet motor. The program code is readable/executable by the processor to calculate an estimated counter electromotive force of the running permanent magnet motor as a function of the estimated disturbance, a control flux, and an angular velocity.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
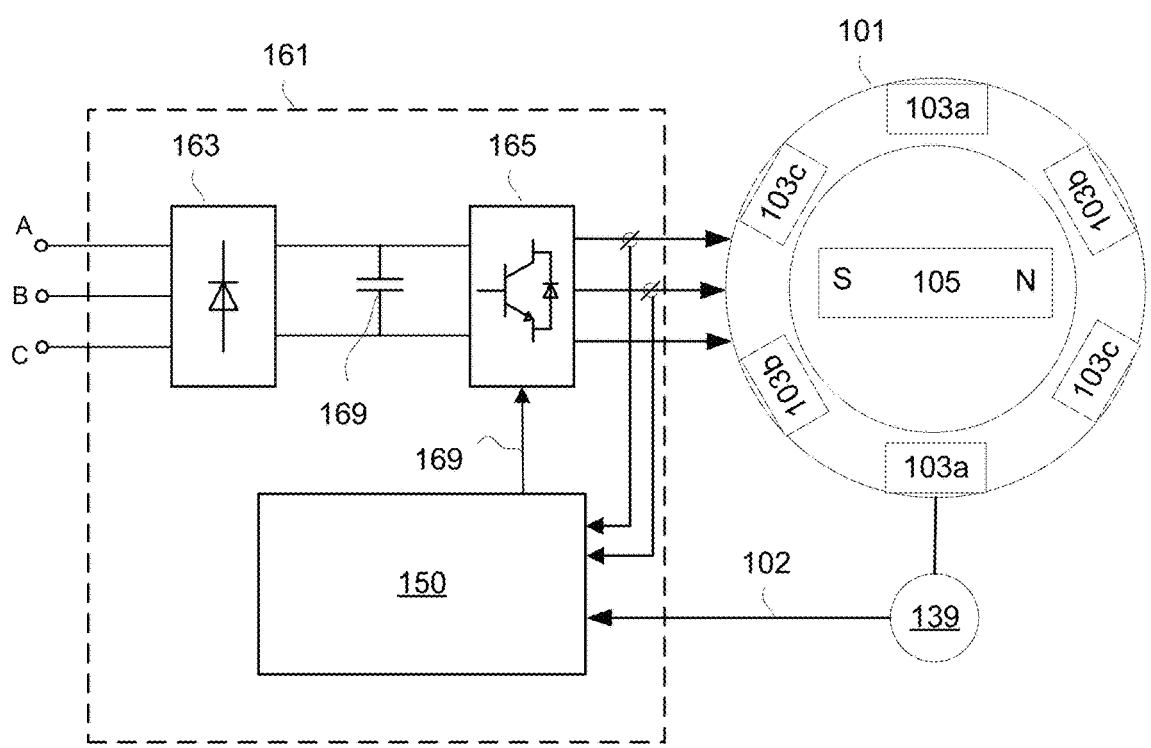
FIG. 1A is a schematic diagram of motor system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device.

Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Java, JavaScript, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic diagram of motor system 100. The system 100 includes a motor 101 and a motor drive 161. The motor 101 may be a permanent magnet (PM) motor 101. Hereafter, the motor 101 is referred to as a PM motor 101, but other motors may be employed.

Figure 4:
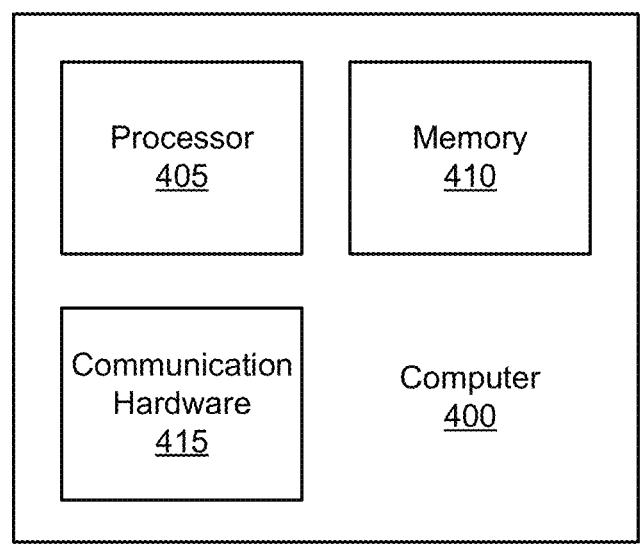
FIG. 4 is a schematic block diagram of a computer according to an embodiment.

The PM motor may be controlled by the motor drive 161 shown in FIG. 1A. In the depicted embodiment, the motor drive 161 includes a rectifier 163, an inverter 165, a bus capacitor 166, and a controller 150. The controller 150 may be in any form of a processor as shown in FIG. 4. The controller 150 may produce the gate signals 169 to control the inverter 165, and therefore control the PM motor 101. In one embodiment, the system 100 includes an encoder 139. The encode 139 may generate a position signal 102. Depending on whether the encoder 139 is used in the system 100, the system 100 can be referred to as close loop control (with encoder 139 and position signal 102) or open loop control (with no encoder 139 or position signal 102).

The motor drive 161 may control the PM motor 101 to generate torque at a specified angular velocity. The motor drive 161 may be required to control the PM motor 101 within a narrow range of angular velocities for a variety of loads. In a certain embodiment, at least a portion of the motor drive 161 comprise one or more of hardware and executable code, the executable code stored on one or more computer readable storage media.

In order to accurately and precisely control the PM motor 101, the motor drive 161 needs such as a number of accurate motor parameters like CEMF, which could be obtained through some tests or estimation prior to normal operation. The embodiments accurately estimate the CEMF, including changes to the CEMF, of the PM motor 101 on line while the PM motor 101 is running. The CEMF may be the voltage produced by the PM rotor 105 affecting the coils 103. In addition, the embodiments may subsequently apply the estimated CEMF in control to make the PM motor control adaptive to CEMF changes. The embodiments may further accurately estimate the CEMF and changes of the PM motor 101 after the PM motor 101 is started and running. As a result, A separate test like a rotation test (normally used in PM control to obtain the CEMF) may not be performed.

In the depicted embodiment, the PM motor 101 includes a PM rotor 105 and a plurality of coils 103a-c. The motor drive 161 may direct electric currents through the coils 103a-c to generate a motor flux that drives the PM rotor 105.

Figure 1B:
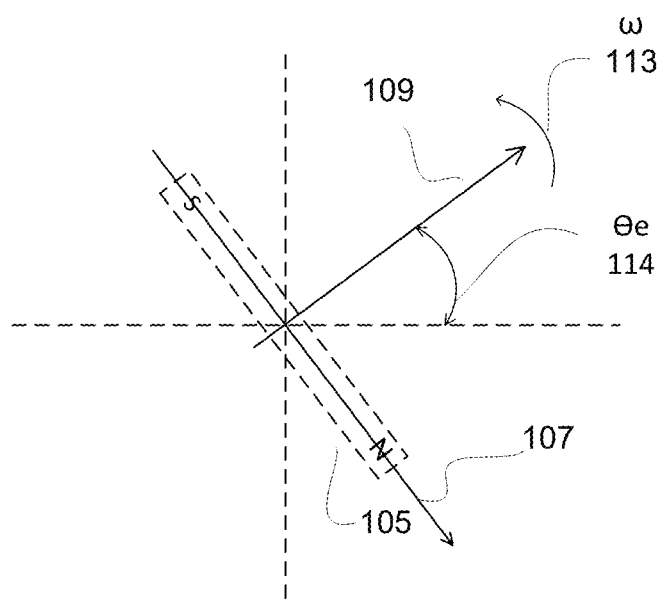
FIG. 1B is a drawing of a direct/quadrature motor model according to an embodiment.

FIG. 1B is a drawing of a direct/quadrature axis defined in synchronous reference frame. All control signal are referenced to this DQ frame, and used to control the PM motor 101. The position θe 114 may be determined from the position signal 102 in close loop control, or from an estimated position signal in open loop control. The angular velocity ω 113 may also be determined from the position signal 102 in close loop control, or from an estimated velocity in open loop control.

Figure 1C:
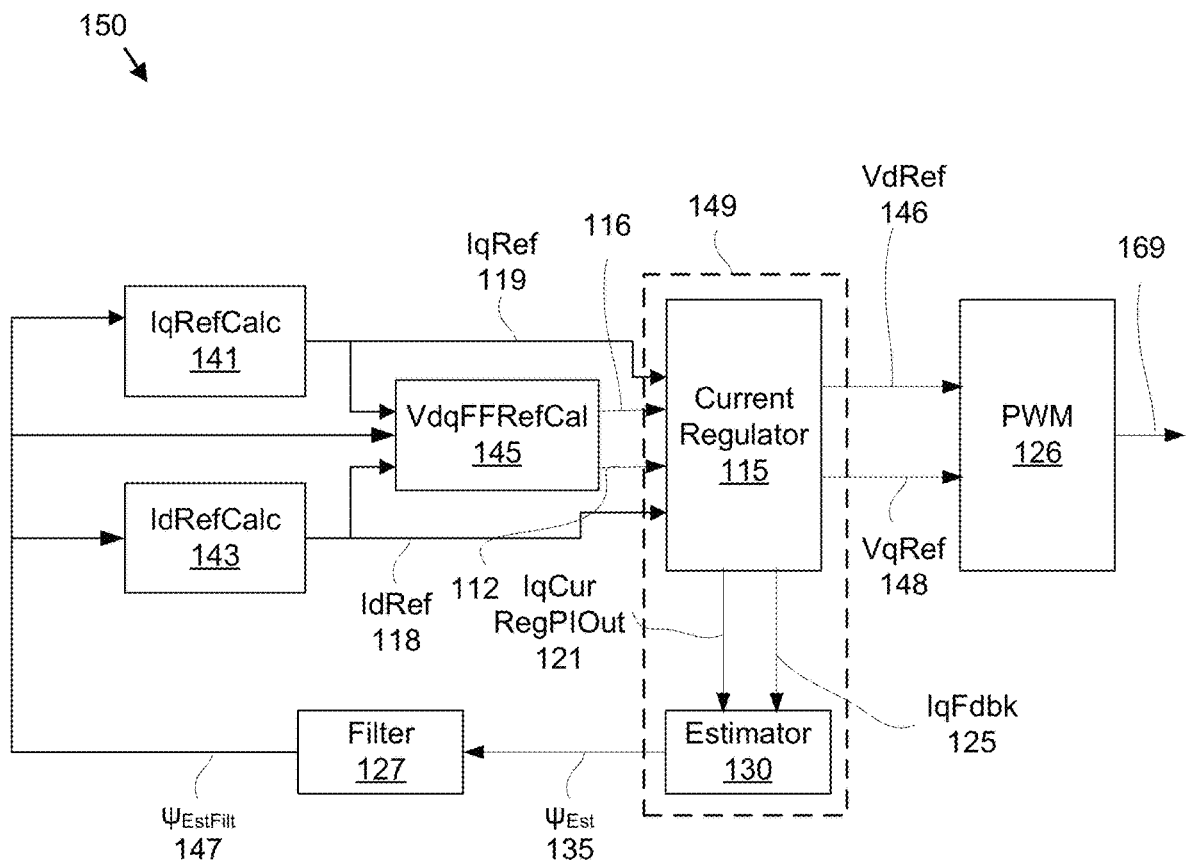
FIG. 1C is a schematic block diagram of a controller according to an embodiment.

FIG. 1C is a schematic block diagram of the controller 150. The controller 150 may generate a quadrature axis current regulator output signal (IqCurRegPIOut) 121. In addition, the controller 150 generates the gates signals 169 that drives the PM motor 101. In the depicted embodiment, the controller 150 includes a quadrature axis current reference calculation (IgRefCalc) 141, a direct axis current reference calculation (IdRefCalc) 143, a direct/quadrature voltage feed forward reference calculation (VdqFFRefCal) 145, a current regulator 115, and estimator 130, and a filter 127. The current regulator 115 and the estimator 130 may be embodied in a CEMF generator 149.

The IqRefCalc 141 and the IdRefCalc 143 receive a filtered estimated CEMF 147 and generate a quadrature current reference (IgRef) 119 and a direct current reference (IdRef) 118 respectively. Alternatively, the IqRefCalc 141 and the IdRefCalc 143 may receive the estimated CEMF 135. The VdqFFRefCal 145 receives the filtered estimated CEMF 147 and/or estimated CEMF 135, the IqRef 119, and the IdRef 118 and generates a direct voltage feed forward reference (VdFFRef) 116 and a quadrature voltage feed forward reference (VqFFRef) 112. The VdFFRef 116, VqFFRef 112, IqRef 119, and the IdRef 118 may drive the current regulator 115 The current regulator 115 receives the VdFFRef 116, the IqRef 119, and the IdRef 118 and generates the Direct Voltage Reference (VdRef) 146 and Quadrature Voltage Reference (VqRef) 148 that drive the Pulse Width Modulator (PWM) 126. The PWM 126 generates the control signals 169 that drive the inverter 165. The current regulator 115 further generates the IqCurRegPIOut 121 and a quadrature axis current feedback signal (IqFdbk) 125. The estimator 130 receives the IqCurRegPIOut 121 and the IqFdbk 125 and generates the CEMF 135. The filter 127 filters the CEMF 135 to generate the filtered estimated CEMF 147.

The CEMF 135 adaptively modifies the calculation of the IqRef 119 and the IdRef 118. In addition, the filtered estimated CEMF 147 adaptively modifies the calculation of the IqRef 119 and the IdRef 118. In one embodiment, the CEMF 135 is continually updated while the PM motor 101 is running. FIG. 6A-D show examples of updating the CEMF 135 from a stored initial value of the CEMF 135.

Figure 2A:
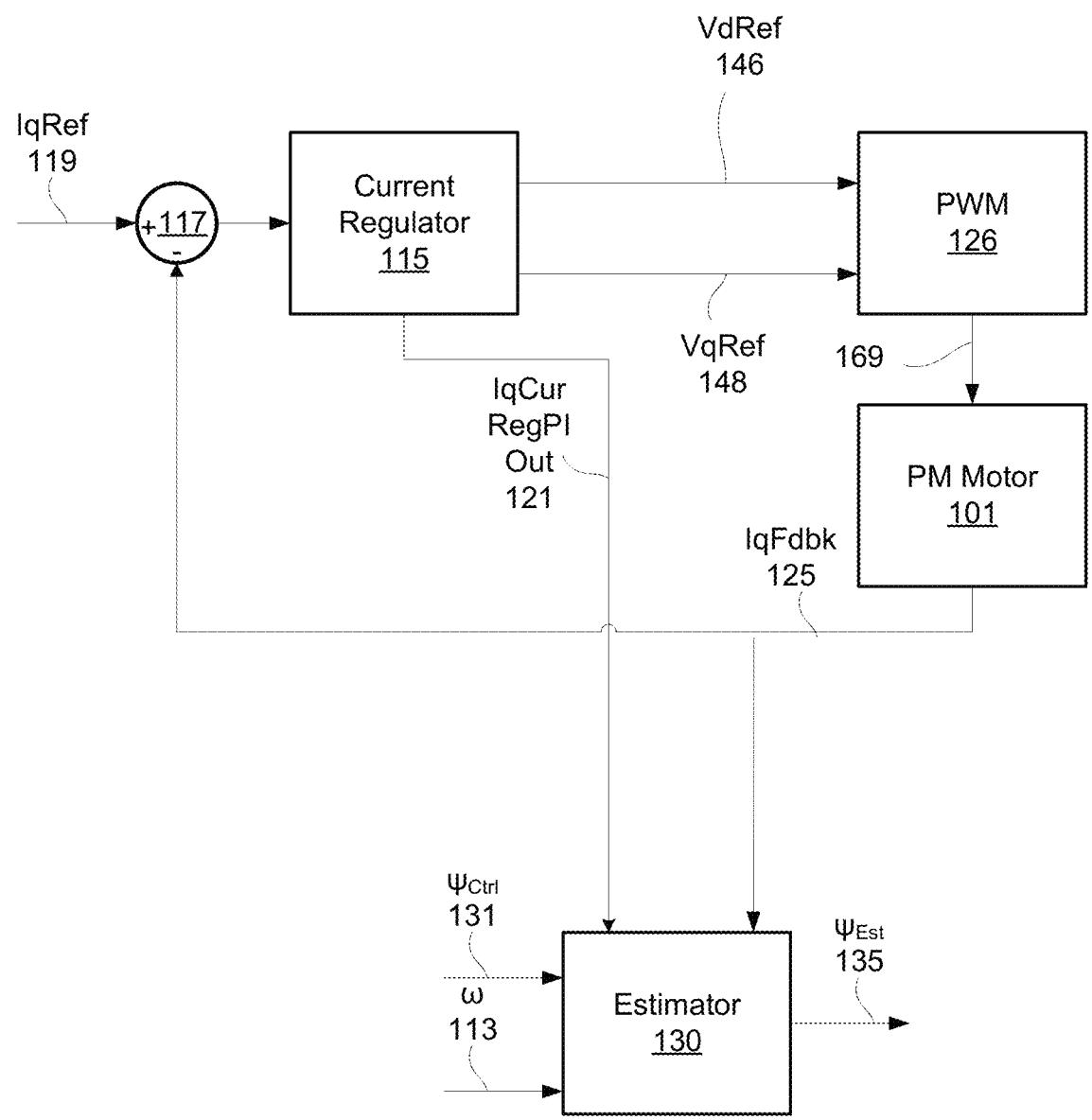
FIG. 2A is a schematic block diagram of a current regulator and estimator according to an embodiment.

FIG. 2A is a schematic block diagram of a current regulator 115 and estimator 130 of the CEMF generator 149. The PWM 126 and PM motor 101 are also shown and may be part of the CEMF generator 149. The depicted embodiment details the origin of signals for the generation of the estimated CEMF 135.

In one embodiment, the IqFdbk 125 is subtracted from the IqRef 119 to drive the current regulator 115. The current regulator 115 generates the IqCurRegPIOut 121. The current regulator 115 further generates VdRef 146 and VqRef 148 which drive the PM motor 101. The IqFdbk 125 may be the quadrature-axis current of the PM motor 101.

The estimator 130 receives the IqCurRegPIOut 121 and the IqFdbk 125. In addition, the estimator 130 receives the control flux 131 and the angular velocity 113. The angular velocity 113 may be measured by a sensor (in close loop control, or from estimated angular velocity in open loop control). The estimator 130 may calculate the CEMF 135. The calculation of the CEMF 135 is described in more detail in FIG. 2B.

Figure 2B:
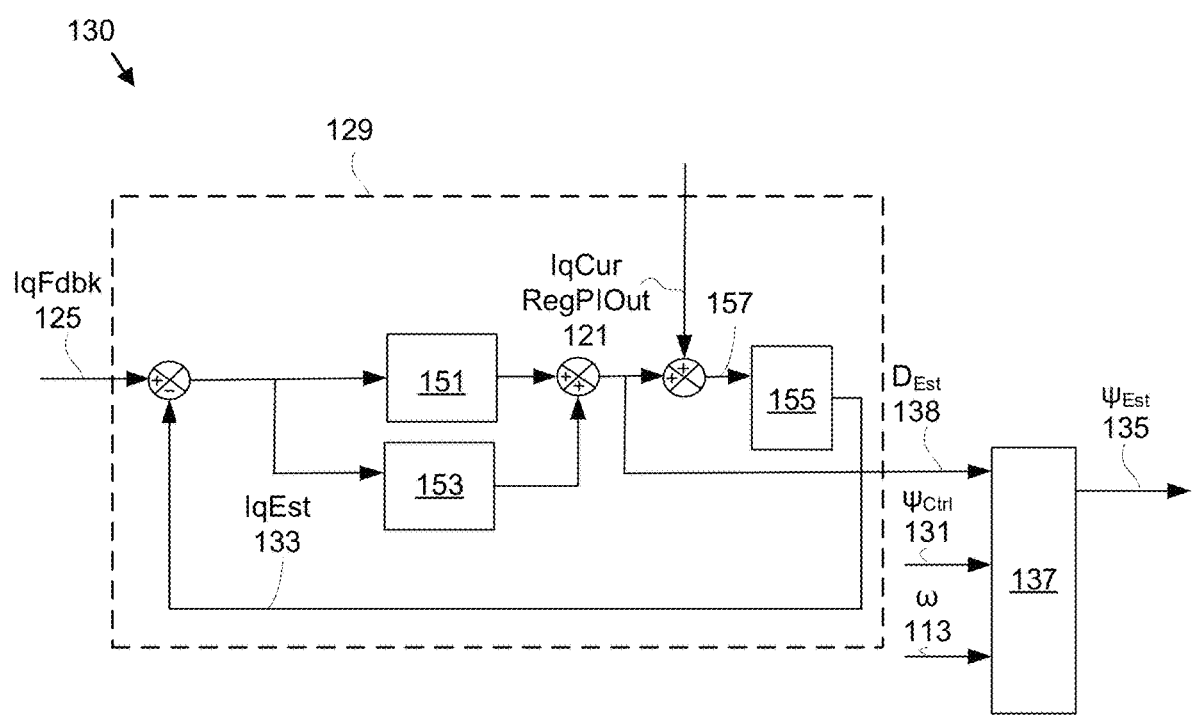
FIG. 2B is a schematic block diagram of an estimator according to an embodiment.

FIG. 2B is a schematic block diagram of the estimator 130. In the depicted embodiment, the estimator 130 includes a disturbance estimator 129 and a calculator 137. In a certain embodiment, at least a portion of the disturbance estimator 129 and a calculator 137 comprise one or more of hardware and executable code, the executable code stored on one or more computer readable storage media.

The disturbance estimator 129 may calculate an estimated disturbance 138 as a control function of the IqCurRegPIOut 121 and the IqFdbk 125. The estimated disturbance 138 may be calculated as the control function of the IqCurRegPIOut 121 and the IqFdbk 125 of the running PM motor 101.

In one embodiment, the disturbance estimator 129 receives the IqCurRegPIOut 121 and the IqFdbk 125 as shown in FIG. 2A. The control function may be a proportional integral (PI) control function driven by the error between the IqFdbk 125 and an estimated quadrature axis current feedback signal (IqEst) 133. In the depicted embodiment, the control function includes a proportional control function 151 and an integral control function 153. The PI control function CF is represented by Equation 1, wherein $K_{P\_Est}$ and $K_{i\_Est}$ are a proportional and an integrational gain respectively. $K_{P\_Est}$ and $K_{i\_Est}$ may be nonzero gains.

$$CF = K_{P\_Est} + \frac{K_{i\_Est}}{s} \qquad \text{Equation 1}$$

The sum of the output of the proportional controller 151 and the integral controller 153 is the estimated disturbance 138. The IqCurRegPIOut 121 is summed with the estimated disturbance 138 to generate an inductance model input signal 157. The inductance model input signal IM 157 drives a quadrature axis inductance model 155 to generate the IqEst 133. In one embodiment, the quadrature axis inductance model MM 155 is given by Equation 2, wherein $L_q$ is a quadrature inductance of the PM motor 101 and s is a frequency transform. The IqEst 133 may be calculated using Equation 3.

$$MM = \frac{1}{L_q s} \qquad \text{Equation 2}$$

$$IqEst = IM \frac{1}{L_q s} \qquad \text{Equation 3}$$

The calculator 137 may calculate the CEMF 135 as a function of the estimated disturbance 138, the control flux 131, and the angular velocity 113. The calculator 137 may calculate the CEMF 135 of the running permanent magnet motor 101. In one embodiment, the CEMF $\psi_{Est}$ 135 is calculated using Equation 4, wherein $D_{Est}$ is the estimated disturbance 138, $\psi_{Ctrl}$ is the control flux 131 used in the current control loop, and w is the angular velocity 113.

$$\psi_{Est} = \frac{D_{Est}}{\omega} - \psi_{Ctrl} \qquad \text{Equation 4}$$

Figure 3:
FIG. 3 is a schematic block diagram of controller data according to an embodiment.

FIG. 3 is a schematic block diagram of controller data 200. The controller data 200 may be organized as a data structure in a memory. In addition, the controller data 200 may be stored in one or more hardware registers. In the depicted embodiment, the controller data 200 includes the quadrature axis current regulator output signal (IqCurRegPIOut) 121, the quadrature axis current feedback signal (IqFdbk) 125, the estimated disturbance 138, the control flux 131, the angular velocity 113, and the estimated CEMF 135.

FIG. 4 is a schematic block diagram of a computer 400. The computer 400 may be embodied in the controller 150. In a certain embodiment, the computer 400 is embodied in the CEMF generator 149. The computer 400 may implement the disturbance estimator 129 and/or the calculator 137.

In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as sensors.

Figure 5A:
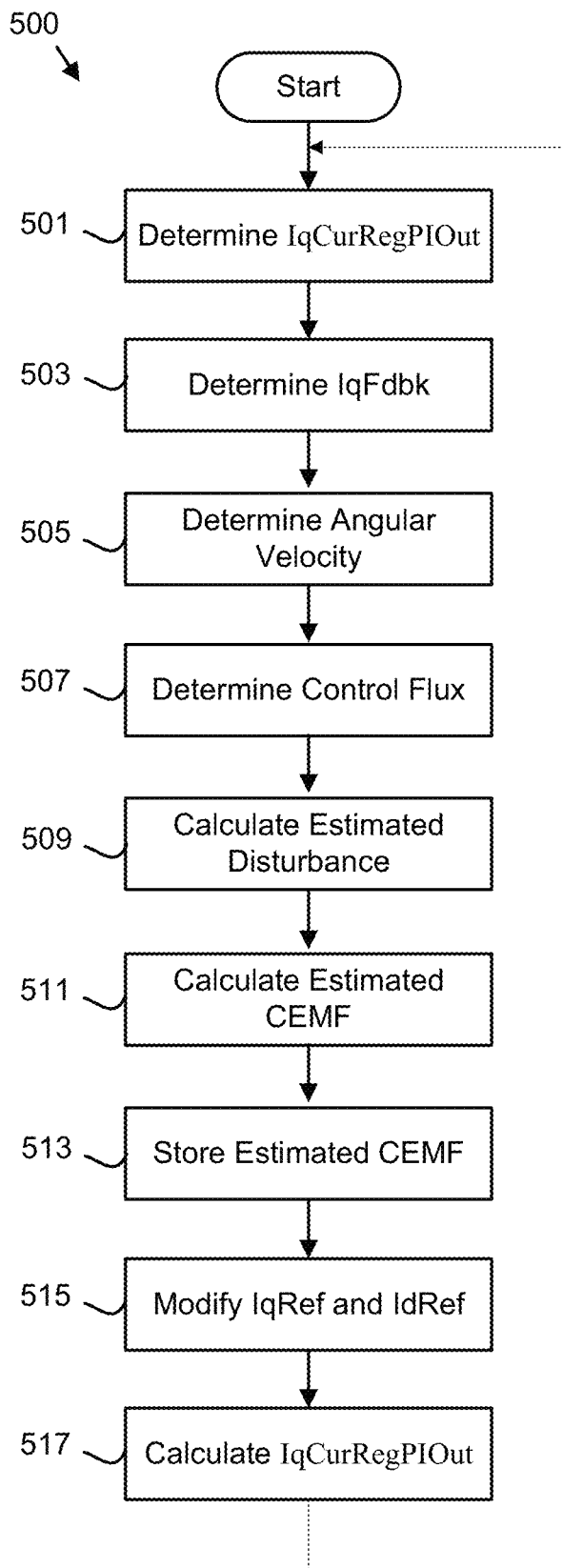
FIG. 5A is a flow chart diagram of a counter electromotive force (CEMF) estimation method according to an embodiment.

FIG. 5A is a flow chart diagram of a CEMF estimation method 500. The method 500 may estimate the CEMF 135. The method 500 may be performed by the controller 150 or elements thereof.

The method 500 starts, and in one embodiment, the controller 150 determines 501 the IqCurRegPIOut 121. The IqCurRegPIOut 121 may be a digital value received from the current regulator 115. Alternatively, the IqCurRegPIOut 121 may be an analog value sampled at the current regulator 115. In addition, the IqCurRegPIOut 121 may be an analog value measured by a sensor at the current regulator 115 and digitized.

The controller 150 may determine 503 the IqFdbk 125. The IqFdbk 125 may be measured from the PM motor 101. The IqFdbk 125 may be digitized. In addition, the IqFdbk 125 may be calculated for the PM motor 101. The IqFdbk 125 may be a digital value. Alternatively, the IqFdbk 125 may be an analog value.

The controller 150 may determine 505 the angular velocity 113. The angular velocity 113 may be measured at the PM motor 101. In addition, the angular velocity 113 may be calculated by the controller 150. The angular velocity 113 may be a digital value.

The controller 150 may further determine 507 the control flux 131. The control flux 131 may be a digital value determined by the controller 150. In addition, the control flux 131 may be measured as an analog value. The control flux 131 may be digitized.

The controller 150 may calculate 509 the estimated disturbance 138. The estimated disturbance 138 may be calculated as the control function of Equation 1. The controller 150 may further calculate 511 the estimated CEMF 135. The CEMF 135 may be calculated using Equation 4.

The controller 150 may store 513 the estimated CEMF 135. The estimated CEMF 135 may be stored in the controller data 200. In addition, the estimated CEMF 135 may be stored in a memory 410.

The controller 150 may modify 515 the values of IqRef 119, IdRef 118, and VRef 116 generated by IqRefCalc 141, IdRefCalc 143, and VdqRefCal 145 respectively as a function of the estimated CEMF 135 and/or the filtered estimated CEMF 147. In addition, the controller 150 may calculate 517 IqCurRegPIOut 121 as a function of IqRefCalc 141, IdRefCalc 143, and VdqFFRefCal 145. The controller 150 may further loop to determine 501 the IqCurRegPIOut 121.

Figure 5B:
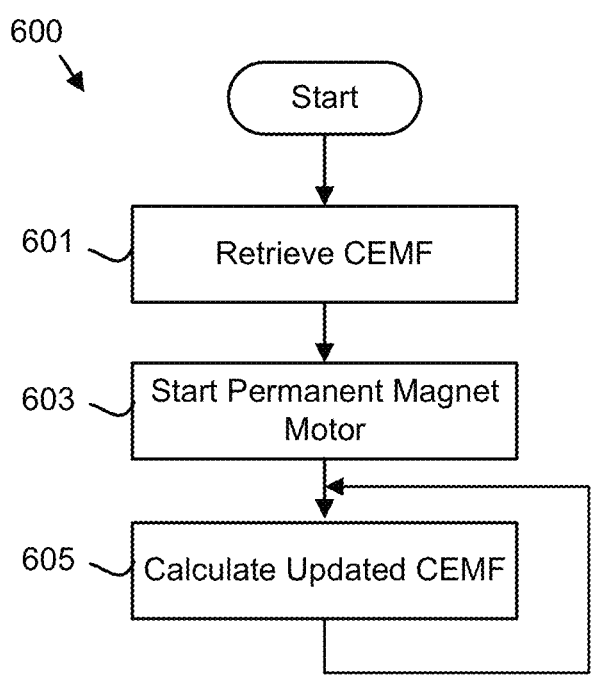
FIG. 5B is a flow chart diagram of an initial CEMF method according to an embodiment.

FIG. 5B is a flow chart diagram of an initial CEMF method 600. The method 600 may determine an initial CEMF 135 that is used when starting a PM motor 101. The method 600 may be performed by the controller 150.

The method 600 starts, and in one embodiment, the controller 150 retrieves 601 the CEMF 135 from the controller data 200. In addition, the controller 150 may retrieve 601 the CEMF 135 from the memory 410. The memory 410 may provide the CEMF 135 during start of the PM motor 101 as an initial value. In one embodiment, no rotation test is performed on the PM motor 101.

The controller 150 further starts 603 the PM motor 101 using the retrieved CEMF 135. For example, the retrieved CEMF 135 may be provided to the IqRefCalc 141, the IdRefCalc 143, and the VdqFFRefCal 145.

The controller 150 may calculate 605 an updated CEMF 135 as the PM motor 101 runs. The updated CEMF 135 may be calculated as described in FIG. 5A. As a result, the control of the PM motor 101 is enhanced and the operation of the controller 150 is improved.

Figure 6A:
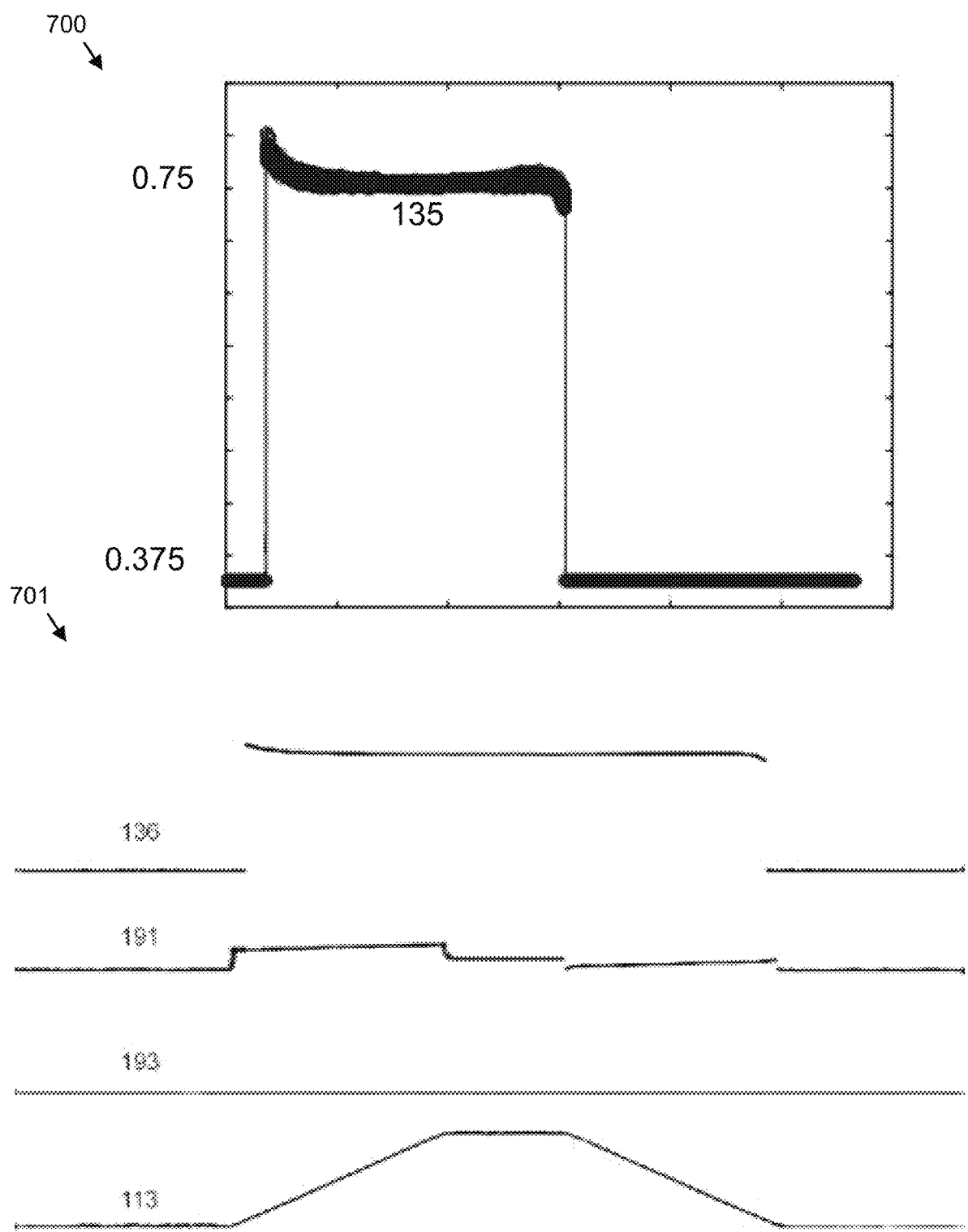
FIG. 6A is graphs of a CEMF estimation in closed loop control according to an embodiment.

FIG. 6A is graphs 700/701 of CEMF estimation in close loop control during a test. In the graph 700, the initial CEMF 135 is 0.375, which is 50 percent of motor rotor flux. The PM motor 101 ramps to 60 Hertz (Hz) with no load. As shown in the graphs 700/701, at the start of the velocity 113 ramping up, the CEMF 135 approaches 0.75, which is actual rotor flux. As motor velocity 113 reaches the stable condition, the CEMF 135 is very accurate and stabilized at 0.75. In graph 701, the rotor flux 136, quadrature current feedback IqFdbk 191, direct current feedback IdFdbk 193, and angular velocity for PM motor 101 are shown for the rotor flux 136 of graph 700.

Figure 6B:
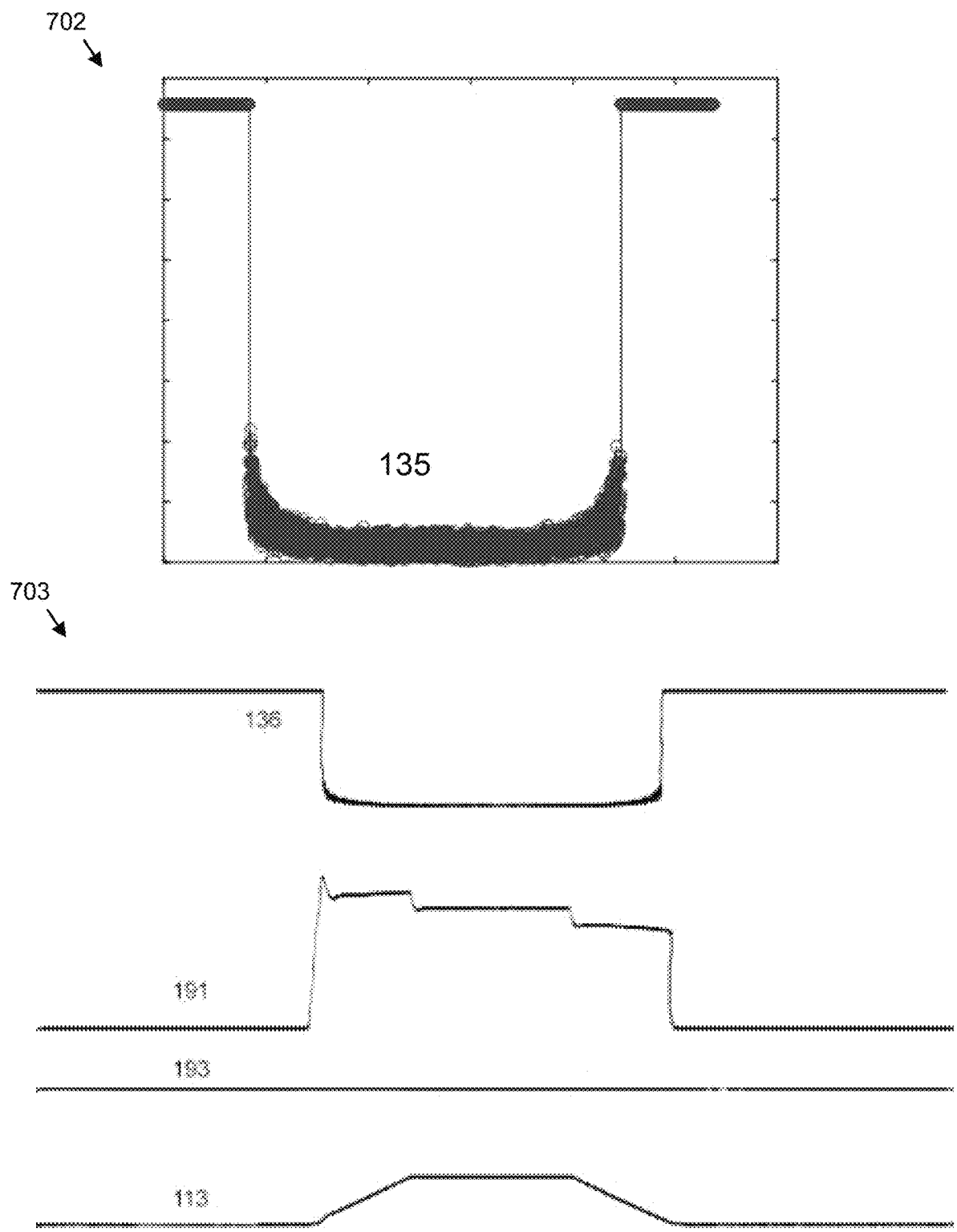
FIG. 6B is graphs of a CEMF estimation in closed loop control according to an embodiment.

FIG. 6B is graphs 702/703 of CEMF estimation in close loop control during a test. In the graph 702, the initial CEMF 135 is 1.125, which is 150 percent of motor rotor flux. The PM motor 101 ramps to 30 Hertz (Hz) with 20 percent load. As shown in the graphs 702/703, at the start of the velocity 113 ramping up, the CEMF 135 approaches 0.75, which is actual rotor flux. As motor velocity 113 reaches the stable condition, the CEMF 135 is very accurate and stabilized at 0.75. In graph 703, the rotor flux 136, quadrature current feedback IqFdbk 191, direct current feedback IdFdbk 193, and angular velocity for PM motor 101 are shown for the rotor flux 136 of graph 702.

Figure 6C:
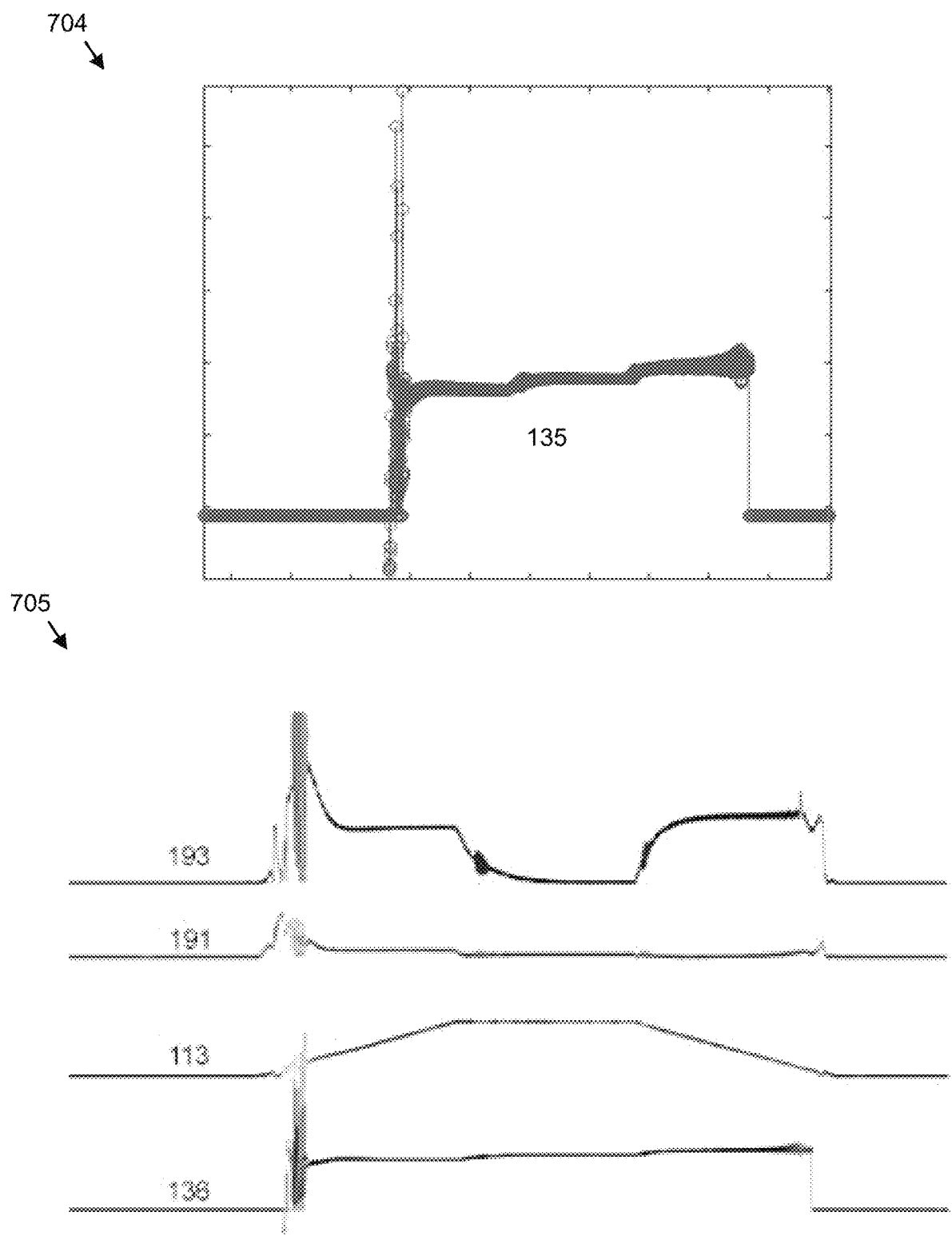
FIG. 6C is graphs of a CEMF estimation in open loop control according to an embodiment.

FIG. 6C is graphs 704/705 of CEMF estimation in open loop control during a test. In the graph 704, the initial CEMF 135 is 0.375, which is 50 percent of motor rotor flux. The PM motor 101 ramps to 30 Hertz (Hz) with no load. As shown in the graphs 704/705, at the starting of the velocity 113 ramping up, the CEMF 135 approaches 0.75, which is actual rotor flux. As motor velocity 113 reaches the stable condition, the CEMF 135 is very accurate and stabilized at 0.75. In graph 705, the rotor flux 136, quadrature current feedback IqFdbk 191, direct current feedback IdFdbk 193, and angular velocity for PM motor 101 are shown for the rotor flux 136 of graph 704.

Figure 6D:
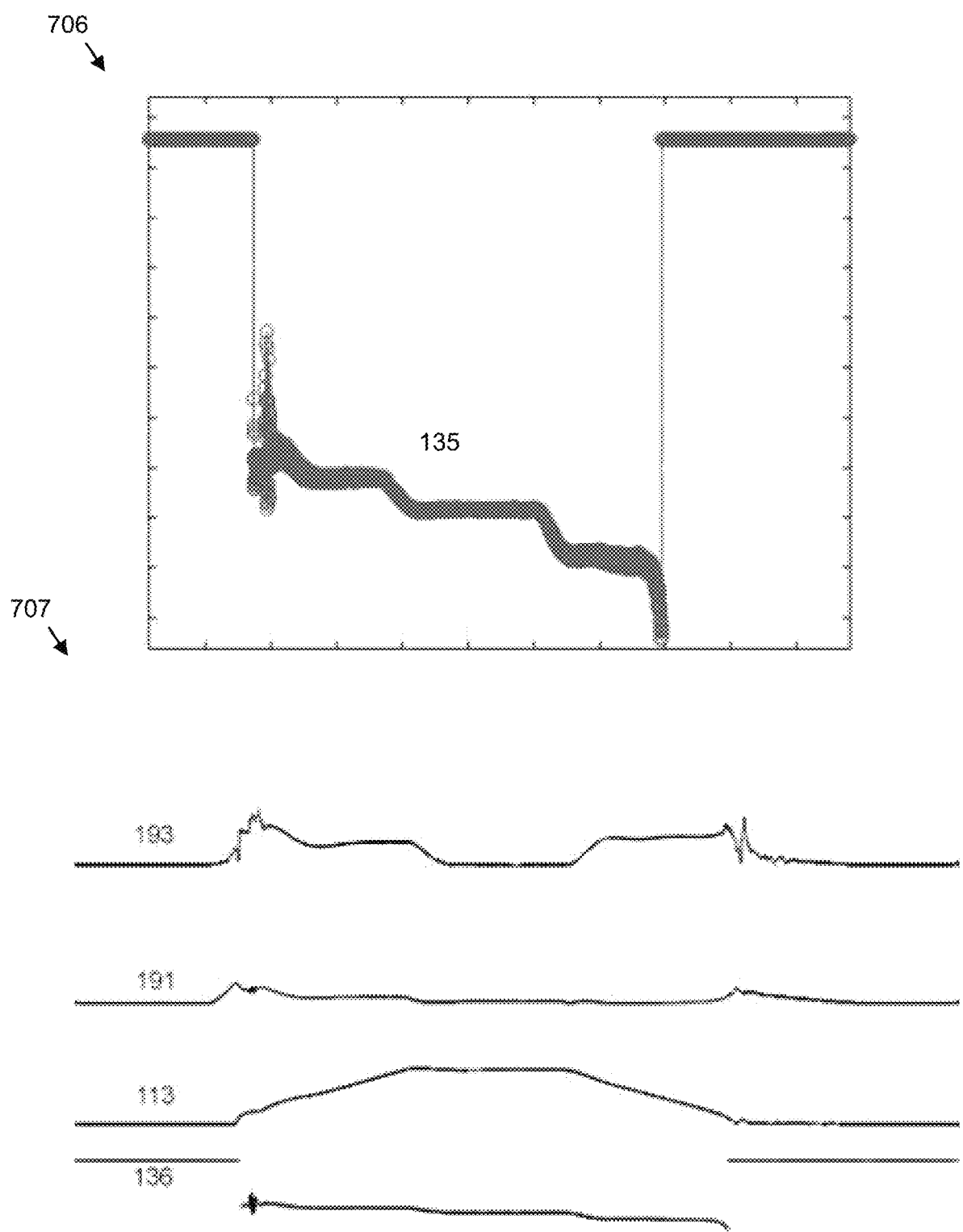
FIG. 6D is graphs of a CEMF estimation in open loop control according to an embodiment.

FIG. 6D is graphs 706/707 of CEMF estimation in open loop control during a test. In the graph 704, the initial CEMF 135 is 1.125, which is 150 percent of motor rotor flux. The PM motor 101 ramps to 30 Hertz (Hz) with no load. As shown in the graphs 706/707, at the start of the velocity 113 ramping up, the CEMF 135 approaches 0.75, which is actual rotor flux. As motor velocity 113 reaches the stable condition, the CEMF 135 is very accurate and stabilized at 0.75. In graph 707, the rotor flux 136, quadrature current feedback IqFdbk 191, direct current feedback IdFdbk 193, and angular velocity for PM motor 101 are shown for the rotor flux 136 of graph 706.

Figure 7A:
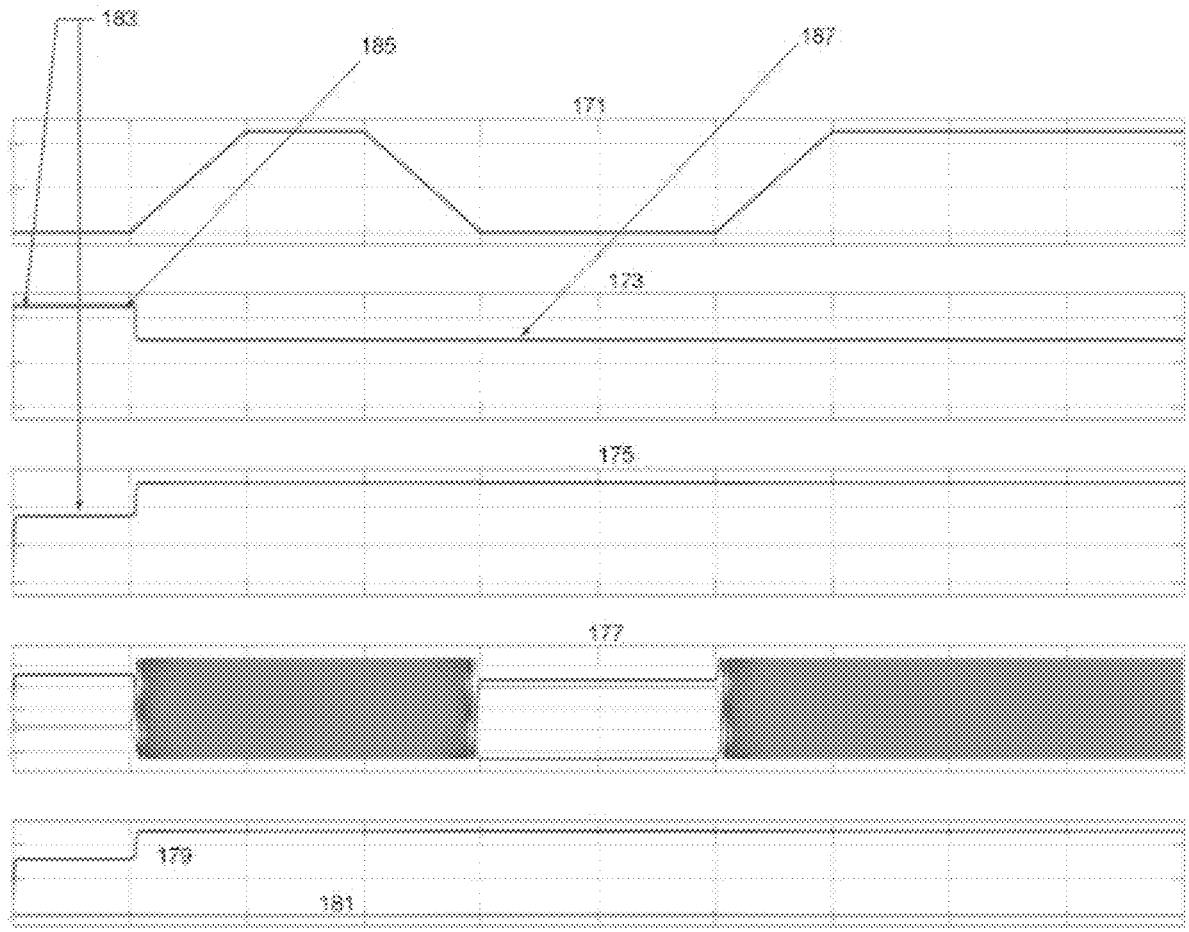
FIG. 7A is a graph of a CEMF closed-loop estimation without rotation test according to an embodiment.

FIG. 7A is a graph of a simulation result in torque control mode with a torque reference equal to a motor rated torque. The initial rotor flux is high. In the depicted embodiment, the initial rotor flux is 150 percent. The CEMF estimation is made without a rotation test. An accurate rotor flux is unknown. The rotor speed 171, estimated flux used 173, torque 175, three-phase current 177, and quadrature current 179 and direct current 181 are shown. At low speed 183, the CEMF 135 is an initial high value, resulting in low torque 175. During ramp up 185, the CEMF 135 converges to the actual EMF 135, bringing torque 175 to a reference value. When the controller 150 stops 187 the PM motor 101, CEMF 135 is stored in the controller data 200, and used during a subsequent ramp up so the desired torque is produced after that.

Figure 7B:
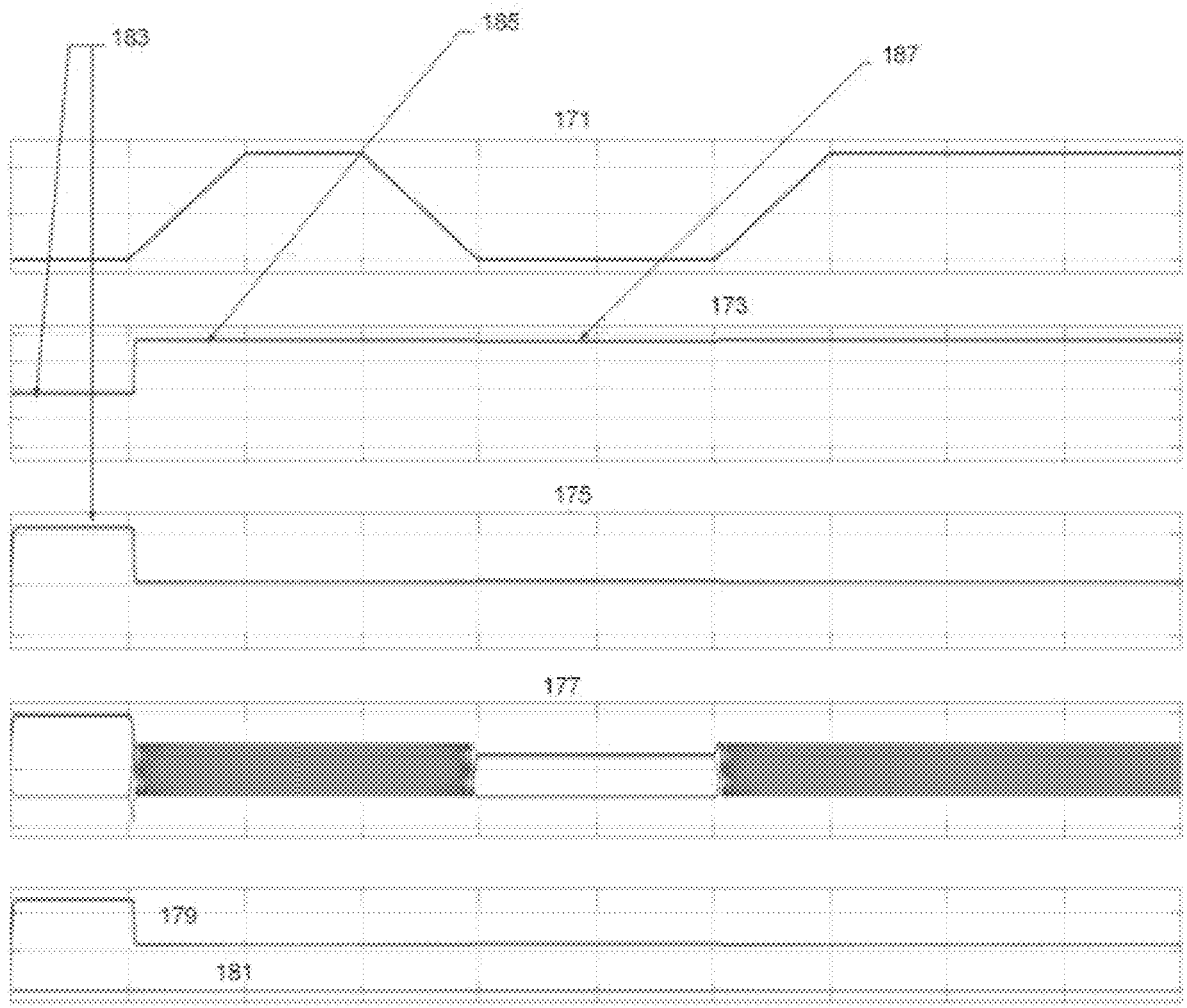
FIG. 7B is a graph of a CEMF closed-loop estimation without rotation test according to an embodiment.

FIG. 7B is a graph of a simulation result in torque control mode with a torque reference equal to a motor rated torque. The initial rotor flux is low. In the depicted embodiment, the initial rotor flux is 50 percent. The CEMF estimation is made without rotation test. An accurate rotor flux is unknown. The rotor speed 171, estimated flux used 173, torque 175, three-phase current 177, and quadrature current 179 and direct current 181 are shown. At low speed 183, the CEMF 135 is an initial low value, resulting in high torque 175. During ramp up 185, the CEMF 135 converges to the actual EMF 135, bringing the torque 175 to a reference value. When the controller 150 stops 187 the PM motor 101, CEMF 135 is stored in the controller data 200, and used during a subsequent ramp up.

Figure 7C:
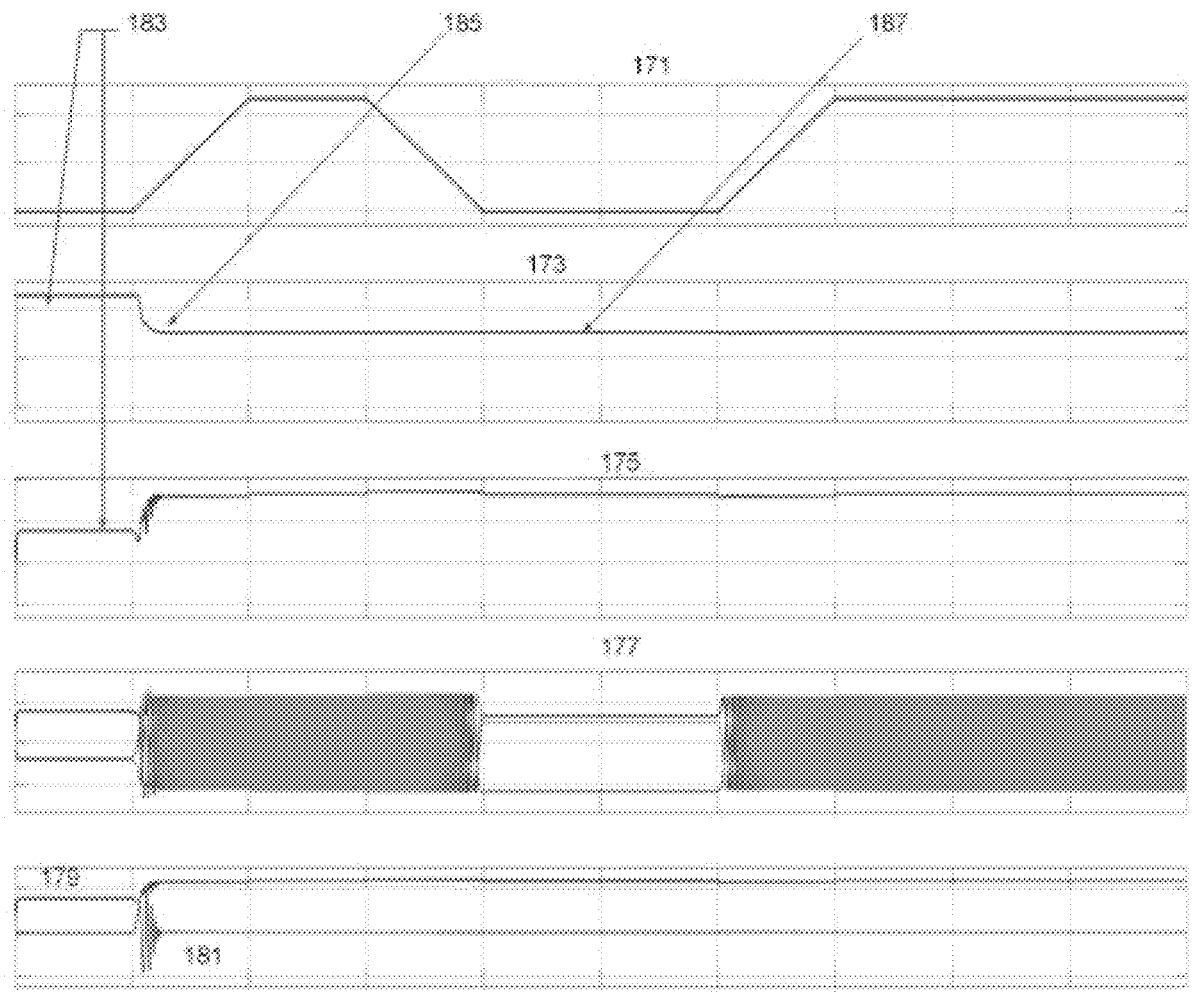
FIG. 7C is a graph of a CEMF open-loop estimation without rotation test according to an embodiment.

FIG. 7C is a graph of a simulation result in torque control mode with a torque reference equal to a motor rated torque. The initial rotor flux is high. In the depicted embodiment, the initial rotor flux is 150 percent. The CEMF estimation is made without rotation test. An accurate rotor flux is unknown. The rotor speed 171, estimated flux used 173, torque 175, three-phase current 177, and quadrature current 179 and direct current 181 are shown. At low speed 183, the CEMF 135 is an initial high value, resulting in low torque 175. During ramp up 185, the CEMF 135 converges to the actual EMF 135, bringing torque 175 to a reference value. When the controller 150 stops 187 the PM motor 101, CEMF 135 is stored in the controller data 200, and used during a subsequent ramp up.

Figure 7D:
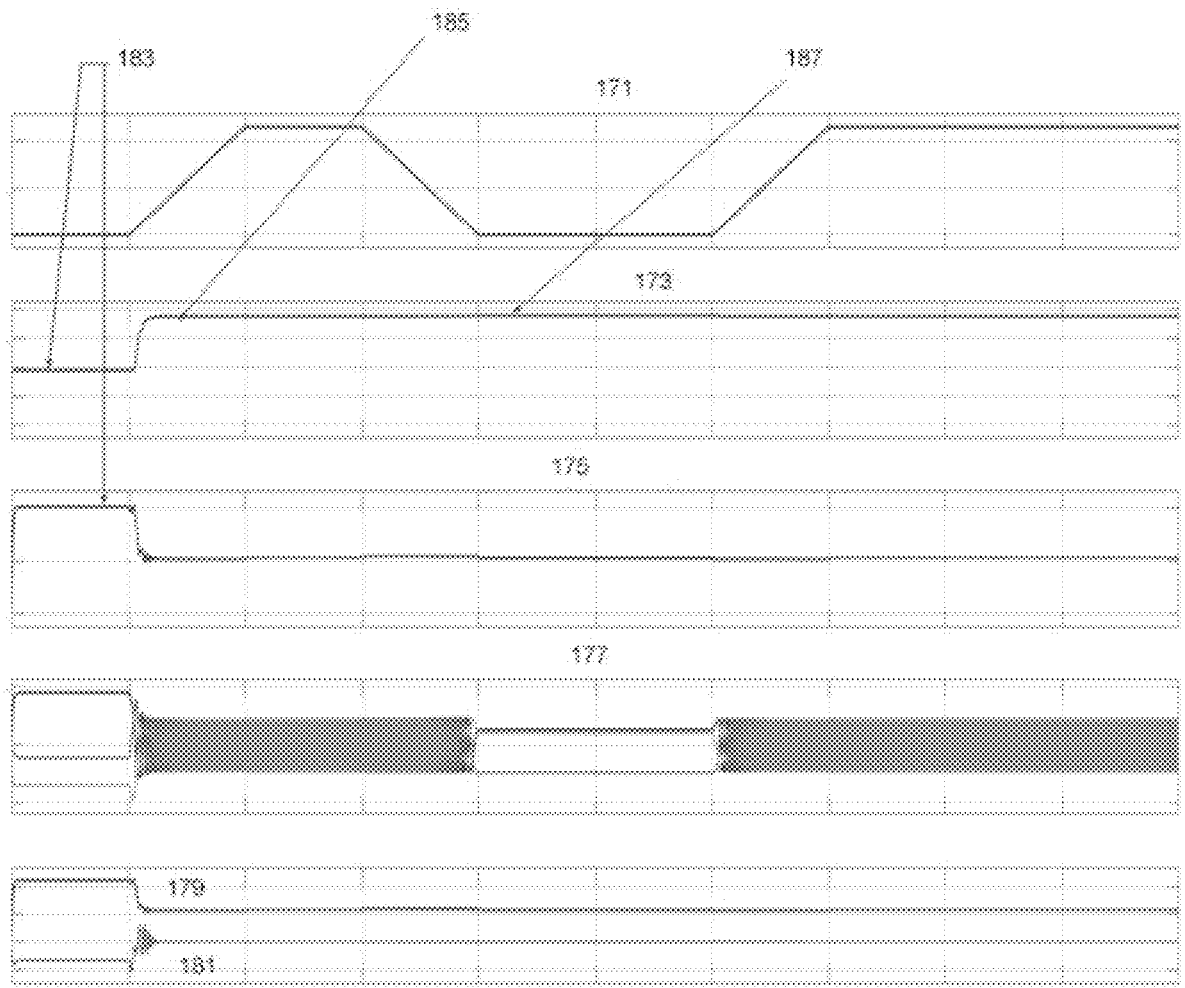
FIG. 7D is a graph of a CEMF open-loop estimation without rotation test according to an embodiment.

FIG. 7D is a graph of a simulation result in torque control mode with a torque reference equal to a motor rated torque. The initial rotor flux is low. In the depicted embodiment, the initial rotor flux is 50 percent. The CEMF estimation is made without rotation test. An accurate rotor flux is unknown. The rotor speed 171, estimated flux used 173, torque 175, three-phase current 177, and quadrature current 179 and direct current 181 are shown. At low speed 183, the CEMF 135 is an initial low value, resulting in high torque 175. During ramp up 185, the CEMF 135 converges to the actual EMF 135, bringing torque 175 to a reference value. When the controller 150 stops 187 the PM motor 101, CEMF 135 is stored in the controller data 200, and used during a subsequent ramp up.

Problem/Solution

A flux vector control algorithm implemented in the controller 150 for PM control may have the current regulator 115 to control torque current IqCur and flux current IdCur according to current reference IdRef 118 and IqRef 116. The current reference IqRef/IdRef 119/118 may be generated by the two calculation block IqRefCalc/IdRefCalc 141/143 based on a MTPA (Max Torque Per Ample) rule, which guarantees the PM motor 101 running in the most efficient operation point, producing the maximum torque with minimum current. The VdqFFRefCalc 145 may calculate the VdFFRef 116 and VqFFRef 112 for the current regulator 115.

The CEMF 135 is used in several places in the flux vector control algorithm, and in the past was a fixed value, which was normally obtained prior to operation by a rotation test or estimation. Firstly, the CEMF 135 is used in IdRefCalc and IqRefCalc. But the CEMF 135 of a PM motor 101 could be changed due to heat, e.g., after the PM motor 101 running for a long period. In this case the calculated IdRef 118 and IqRef 119 may not be the optimal operation point, and could cause several issue like high torque error, low power efficiency, and earlier field weakening operation. Secondly, CEMF 135 is also used in VdqFFRefCal 145, and may cause the error in VdFFRef/VqFFRef 116/112 when CEMF 135 is changing. This will cause the current regulator response and/or system dynamic response to worsen.

CEMF 135 is normally obtained by a rotation test, during this test PM motor 101 has to rotate, and the voltage induced in the stator is captured to calculate the CEMF 135. This test has to be done before the drive normally runs, and sometimes the test is one of the tests in autotune process. But in some applications like hoist and lifting system, motor rotation before normal operation is not allowed or hard to proceed. In this case only an estimated CEMF value based on motor name plate data, which is not accurate, could be used and could cause the same issue as mentioned above.

The CEMF estimation disclosed herewith can online estimate and track the CEMF 135 and CEMF changes of a PM motor 101, and subsequently apply the estimated CEMF 135 in control to make PM control adaptive to any CEMF changes, and make the PM motor 101 always run in an optimal operation point.

The CEMF estimation disclosed herewith can accurately estimate the CEMF 135 value and changes of a PM motor 101 after the PM motor 101 is running, so that a separate test like rotation test (normally used in PM control to obtain CEMF value) can be removed. As a result, the performance of the motor drive 161 and/or processor 405 is improved.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    a disturbance estimator that calculates an estimated disturbance as a control function of a quadrature axis current regulator output signal (IqCurRegPIOut) and a quadrature axis current feedback signal (IqFdbk) of a running permanent magnet motor; and
    a calculator that calculates an estimated counter electromotive force (CEMF) of the running permanent magnet motor as a function of the estimated disturbance, a control flux, and an angular velocity,
    wherein at least a portion of the disturbance estimator and a calculator comprise one or more of hardware and executable code, the executable code stored on one or more computer readable storage media.

2. The apparatus of claim 1, wherein the control function is a proportional integral (PI) control function driven by the error between the IqFdbk and an estimated quadrature axis current feedback signal (IqEst) calculated from a quadrature axis inductance model driven by the sum of the IqCurRegPIOut and the estimated disturbance.

3. The apparatus of claim 2, wherein the PI control function is represented by $$CF = K_{P\_Est} + \frac{K_{i\_Est}}{s},$$

wherein $K_{P\_Est}$ and $K_{i\_Est}$ are proportional and integrational gain respectively.

4. The apparatus of claim 2, wherein the quadrature axis inductance model MM is $$MM = \frac{1}{L_q s},$$

wherein $L_q$ is a quadrature inductance of the permanent magnet motor and s is a frequency transform.

5. The apparatus of claim 1, the apparatus further comprising a memory that stores the CEMF and provides the CEMF 135 during start of the permanent magnet motor as an initial value.

6. The apparatus of claim 1, wherein the CEMF is calculated as $$\psi_{Est} = \frac{D_{Est}}{\omega} - \psi_{Ctrl},$$

wherein $\psi_{Est}$ is the estimated disturbance, $\psi_{Ctrl}$ is the control flux, and $\omega$ is the angular velocity.

7. The apparatus of claim 1, wherein the CEMF adaptively modifies the calculation of a quadrature axis current reference (IqRef) and a direct axis current reference (IdRef) that drive a current regulator generating IqCurRegPIOut for the permanent magnet motor.

8. The apparatus of claim 7, wherein the CEMF is continually updated.

9. The apparatus of claim 1, wherein no rotation test is performed on the permanent magnet motor.

10. The apparatus of claim 1, the apparatus further comprising the permanent magnet motor.

11. A method comprising:
calculating an estimated disturbance as a control function of a quadrature axis current regulator output signal (IqCurRegPIOut) and a quadrature axis current feedback signal (IqFdbk) of a running permanent magnet motor; and
calculating an estimated counter electromotive force (CEMF) of the running permanent magnet motor as a function of the estimated disturbance, a control flux, and an angular velocity.

12. The method of claim 11, wherein the control function is a proportional integral (PI) control function driven by the error between the IqFdbk and an estimated quadrature axis current feedback signal (IqEst) calculated from a quadrature axis inductance model driven by the sum of the IqCurRegPIOut and the estimated disturbance.

13. The method of claim 12, wherein the PI control function is represented by $$CF = K_{P\_Est} + \frac{K_{i\_Est}}{s},$$

wherein $K_{P\_Est}$ and $K_{i\_Est}$ are proportional and integrational gain respectively.

14. The method of claim 12, wherein the quadrature axis inductance model MM is $$MM = \frac{1}{L_q s},$$

wherein $L_q$ is a quadrature inductance of the permanent magnet motor and s is a frequency transform.

15. The method of claim 11, the method further comprising storing the CEMF and providing the CEMF during start of the permanent magnet motor as an initial value.

16. The method of claim 11, wherein the CEMF is calculated as $$\psi_{Est} = \frac{D_{Est}}{\omega} - \psi_{Ctrl},$$

wherein $\psi_{Est}$ is the estimated disturbance, $\psi_{Ctrl}$ is the control flux, and $\omega$ is the angular velocity.

17. The method of claim 11, wherein the CEMF adaptively modifies the calculation of a quadrature axis current reference (IqRef) and a direct axis current reference (IdRef) that drive a current regulator generating IqCurRegPIOut for the permanent magnet motor.

18. The method of claim 17, wherein the CEMF is continually updated.

19. The method of claim 11, wherein no rotation test is performed on the permanent magnet motor.

20. A computer program product comprising a computer readable storage medium having program code embodied therein, the program code readable/executable by a processor to:
calculate an estimated disturbance as a control function of a quadrature axis current regulator output signal (IqCurRegPIOut) and a quadrature axis current feedback signal (IqFdbk) of a running permanent magnet motor; and
calculate an estimated counter electromotive force (CEMF) of the running permanent magnet motor as a function of the estimated disturbance, a control flux, and an angular velocity.

* * * * *